US010868313B2

(12) United States Patent
Gruenwald et al.

(10) Patent No.: US 10,868,313 B2
(45) Date of Patent: Dec. 15, 2020

(54) SEPARATOR PLATE FOR AN ELECTROCHEMICAL SYSTEM (71) Applicant: REINZ-DICHTUNGS-GMBH, Neu-Ulm (DE)

(72) Inventors: Bernadette Gruenwald, Ulm (DE); Claudia Kunz, Ulm (DE); Joachim Scherer, Ulm (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 436 days.

(21) Appl. No.: 15/752,634

(22) PCT Filed: Aug. 9, 2016

(86) PCT No.: PCT/EP2016/068956
§ 371 (c)(1),
(2) Date: Feb. 14, 2018

(87) PCT Pub. No.: WO2017/029158
PCT Pub. Date: Feb. 23, 2017

(65) Prior Publication Data
US 2018/0241049 A1 Aug. 23, 2018

(30) Foreign Application Priority Data
Aug. 14, 2015 (DE) .................... 20 2015 104 300 U (51) Int. Cl.
*H01M 8/0206* (2016.01)
*H01M 8/0247* (2016.01)
(Continued)

(52) U.S. Cl.
CPC ......... *H01M 8/0206* (2013.01); *H01M 8/026* (2013.01); *H01M 8/0247* (2013.01);
(Continued)

(58) Field of Classification Search
CPC .................................................. H01M 8/0258
See application file for complete search history.

(56) References Cited

U.S. PATENT DOCUMENTS

| 4,983,472 A | 1/1991 | Katz |
| 2004/0048135 A1* | 3/2004 | Hartnack ............ H01M 8/0271 429/468 |

(Continued)

FOREIGN PATENT DOCUMENTS

| FR | 2997561 | 5/2014 |
| FR | 2997562 | 5/2014 |

(Continued)

OTHER PUBLICATIONS

Europoean Patent Office, International Search Report with Written Opinion issued in PCT/EP2016/068956, dated Oct. 27, 2016, 11 pages, European Patent Office, Rijswijk, Netherlands.

*Primary Examiner* — Brian R Ohara
(74) *Attorney, Agent, or Firm* — McCoy Russell LLP (57) ABSTRACT A separator plate for an electrochemical system is described. The separator plate may have a first individual plate and a second individual plate which is connected to the first individual plate. The first individual plate may have two first channels for leading media, the first channels running next to one another, being shaped in the first individual plate and being separated from one another at least in sections by a web which is formed between the first channels. The second individual plate may have a second channel which is for leading media and is shaped in the second individual plate. The web which is formed between the first channels and the second channel which is shaped in the second individual plate are designed and arranged in a manner such that a projection of the second channel onto the first individual plate perpendicularly to the planar surface plane of the first (Continued)

individual plate crosses the web along a crossing region of the web.

16 Claims, 8 Drawing Sheets

(51) Int. Cl.
  *H01M 8/0254* (2016.01)
  *H01M 8/0258* (2016.01)
  *H01M 8/026* (2016.01)
  *H01M 8/0267* (2016.01)
  *H01M 8/10* (2016.01)

(52) U.S. Cl.
  CPC ....... *H01M 8/0254* (2013.01); *H01M 8/0258* (2013.01); *H01M 8/0267* (2013.01); *H01M 8/10* (2013.01)

(56) References Cited

U.S. PATENT DOCUMENTS

| | | | |
|---|---|---|---|
| 2006/0003220 A1* | 1/2006 | Sugiura | H01M 8/04074 |
| | | | 429/434 |
| 2006/0054664 A1 | 3/2006 | Strobel et al. | |
| 2006/0254047 A1* | 11/2006 | Stroebel | H01M 8/0228 |
| | | | 29/623.2 |
| 2009/0162733 A1* | 6/2009 | Iverson | H01M 8/0271 |
| | | | 429/446 |
| 2015/0280253 A1* | 10/2015 | Olsommer | H01M 8/04007 |
| | | | 429/514 |

FOREIGN PATENT DOCUMENTS

| | | |
|---|---|---|
| WO | 2014067781 | 5/2014 |
| WO | 2014067782 | 5/2014 |

* cited by examiner

SEPARATOR PLATE FOR AN ELECTROCHEMICAL SYSTEM

BACKGROUND OF THE INVENTION

The invention relates to a separator plate for an electrochemical system.

Known electrochemical systems, for example fuel cell systems or electrochemical compressor systems as well as electrolysers, just as humidifiers for electrochemical systems, usually comprise a multitude of separator plates are arranged into a stack, so that two adjacent separators plates enclose an electrochemical cell or a humidifier cell. The separator plates usually each comprise two individual plates which are connected to one another along their rear sides which are away from the electrochemical cells or the humidifier cells. The separator plates can serve e.g. for the electrical contacting of the electrodes of the individual electrochemical cells (e.g. fuel cells) and/or for the electrical connection of adjacent cells (series connection of the cells). Bipolar plates are often applied as separator plates in the case of fuel cells. The term "electrochemical system" in the context of this invention also includes humidifier systems for other electrochemical systems.

The individual plates of the separator plates can comprise channel structures for the supply of the cells with one or more media and/or for the away-transport of media. The media can for example be fuels (e.g. hydrogen or ethanol), reaction gases (e.g. air or oxygen) or a coolant as the fed media and reaction products and heated coolant as the media which are led away. Moreover, the separator plates can serve for leading away the waste heat which arises in the electrochemical cell, as arises in a fuel cell for instance on converting electrical or chemical energy, as well as for sealing the different media channels or cooling channels to one another and/or to the outside. Concerning fuel cells, the reaction media, i.e. fuel and reaction gases are led on the surfaces of the individual plates which are away from one another, whereas the coolant is led between the individual plates. The electrochemical cells in particular of a fuel cell can each comprise e.g. a membrane electrode assembly or MEA, each with a polymer electrolyte membrane (PEM). The MEAs can also comprise one or more gas diffusion layers (GDL) which are usually orientated towards the separator plates, in particular towards bipolar plates of fuel cell systems and are designed e.g. as a carbon non-woven. Concerning humidifiers for electrochemical systems, the cell is formed by an essentially gas-impermeable but water-permeable membrane which can be supported by supporting media, as well as by at least one diffusion medium of a textile or carbon non-woven, preferably one on both sides.

The construction and the function of the individual plates often necessitates the channels of the individual plates of the same separator plate in a manner crossed to one another at least in regions running, so that the rear sides of the channel bases can only be brought into contact or are connectable in the crossing regions. Inasmuch as the individual plates are connected in the region of the crossing channels, such an arrangement therefore places high demands upon the accuracy of the positioning of the individual plates relative to one another as well as upon the positioning of the instrument which is provided for forming the connection, relative to the individual plates. Common methods for connecting the individual plates to one another are e.g. welding, in particular laser-welding, soldering or bonding. If the necessary precision of the positioning is not kept to on connecting, then the connections are too weak or are at least partly completely absent on account of the offset. In particular, the pressure of the coolant which is led between the individual plates can lead to a tearing of the connections, wherein these for example tear open between the plates or e.g. a weld spot is torn out of one or both individual plates, so that a hole arises in at least one plate. The offset can additional or alternatively lead to too much energy being brought into a point of an individual plate and burning through this, so that a hole likewise arises. The individual plates can therefore become damaged along the connecting locations to the extent that they become unusable. This can lead to the electrochemical cells or humidifier cells which are enclosed between adjacent separator plates being flooded with a cooling fluid which is led between the individual plates and which enters through the tears in the individual plates, through the individual plates. This too can lead to a direct, uncontrolled reaction between the reaction media if both individual plates comprise holes. Both can lead to the failure of the complete stack. The methods for connecting the individual plates in regions, in which the channels of the individual plates run in a crossed manner, said method having been applied until now, can therefore result in a high rejection during the production or to a reduced service life of the system on operation.

SUMMARY OF THE INVENTION

It is therefore the object of the present invention to provide a separator plate for an electrochemical system which is as stable as possible also in a region, in which the channels of the individual plates of the separator plate run in a manner crossed to one another, and which is manufacturable with as low as possible rejects.

This object is achieved by a separator plate for an electrochemical system according to claim 1. Special designs of the suggested separator plate are described in the dependent claims.

What is suggested here is a separator plate for an electrochemical system, said separator plate comprising a first individual plate and a second individual plate which is connected to the first individual plate. The first individual plate comprises at least two first channels for leading media, said first channels running next to one another, being shaped in the first individual plate and being separated from one another at least in sections by a web which is formed between the first channels. The second individual plate comprises a second channel for leading media, said second channel being shaped in the second individual plate. The web which is formed between the first channels and the second channel which is shaped in the second individual plate are designed and arranged in a manner such that a projection of the second channel onto the first individual plate perpendicularly to the planar surface plane of the first individual plate crosses the web in a crossing region of the web and/or along the crossing region.

The suggested separator plate is particularly characterised in that the web is sunk in the crossing region of the web, so that the first channels which run on both sides of the web are in fluid connection via the depression of the web and that a rear side of the base of the depression of the web, said rear side facing the second individual plate, is materially connected to a rear side of the base of the second channel, said rear side facing the first individual plate.

Instead of using the formulation whereby a projection of the channels and/or webs of the second individual plate onto the first individual plate crosses the webs and/or the channels of the first individual plate or vice versa, the shorter formulation whereby the channels and/or the webs of the second individual plate cross the webs and/or channels of the first individual plate or vice versa is also used hereinafter for the sake of simplicity. However, this is always to be understood in that the webs and channels of the two individual plates which cross one another each run at least in sections in different planes, wherein these planes are mainly aligned parallel to one another.

The region, in which the two individual plates are connected or are connectable is enlarged due to the fact that the web which separates the first channels is sunk where it crosses the second channel and that a rear side of the base of the depression, said rear side facing the second individual plate, is materially connected to a rear side of the base of the second channel, said rear side facing the first individual plate. The two individual plates are specifically not only connected or connectable to one another where the channels of the first individual plate and the channels of the second individual plate cross one another and their rear sides thus come into contact with one another, but additionally in the crossing region of the web between the channels of the first individual plate where a greater contact surface of the rear sides of the individual plates is given due to the depression of the web. This increases the stability of the connection between the individual plates and places lower demands upon the spatial accuracy of the selected connecting technology. The rejection rate on manufacturing the separator plate and the service life of the separator plate on operation can thus be improved.

Due to the fact that the first channels which run on both sides of the web are in fluid connection via the depression of the web, the positioning of the depression along the first channels can moreover be utilised in a targeted manner, in order to influence the flow behaviour of the media in the first channels and in the intermediate space between the individual plates.

The web depression with regard to its contact surface to at least one channel of the other individual plate can be designed in a manner such that it extends along the running direction of the web in the region of the depression, thus parallel to the running direction of the channels which run on both sides of the web, over a length which at the most is fivefold or at the most thrice the largest width of the at least one channel which is crossed by it or of a web which is possibly crossed by it, at half the height of the channel and web respectively. One can therefore ensure that the flow behaviour of the medium in the channels is not influenced any more than is necessary or nor compromised by the web depression. However, in order to achieve the advantages which the web depression entails, it is desirable for the length of the web depression along the running direction of the web or along the running direction of the channels which run on both sides of the web to be at least 0.5 times the width of the crossed channel in the base region of this channel. However, for a stable connection it is advantageous for the length of the depression to be at least 0.15 mm independently of the channel widths.

A multitude of first channels which run next to one another and are for leading media can be shaped in the first individual plate, wherein adjacent channels of the multitude of the first channels are separated at least in sections by a web. A multitude of second channels which run next to one another and which are for leading media can likewise be shaped in the second individual plate, wherein the first channels, the webs of the first individual plate and the second channels can be designed and arranged in a manner such that projections of the second channels onto the first individual plate perpendicularly to the planar surface plane of the first individual plate cross the webs of the first individual plate along one or more crossing regions of the webs. The webs of the first individual plate can be sunk in these crossing regions or at least in some of the crossing regions, so that the first channels which run on both sides of the respective web of the first individual plate are in fluid connection via the depression of this web. A rear side of the base of the depression, said rear side facing the second individual plate, in the respective web of the first individual plate can then again be materially connected to a rear side of the base of the second channel of the second individual plate, said rear side facing the first individual plate and said second channel crossing the web of the first individual plate. The stability and the service life of the separator plate can be increased by an adequately large number of web depressions in the crossing regions of the webs of the first individual plate and the material-fit connection which is formed in this crossing region.

In particular, in the case of a multitude of first channels which run next to one another which is described here, an influence can be exerted upon the flow behaviour (e.g. medium flow rate, hydrostatic pressure, flow speed) of the medium in the first channels by way of the selection of the positions for the web depressions between adjacent channels. The targeted placing of the material-fit connections between the first and the second individual plate can also serve to influence the flow behaviour of a cooling medium which is led between the two individual plates, typically to homogenise it, in a very similar manner. The number and arrangement of the web depressions and the material-fit connections in the region of web depressions is preferably selected such that a balance results between an optimal flow guidance of these media and optimal life duration of the separator plate. It is particularly advantageous if the depressions are arranged such that they lie essentially in the extension of the cooling means conduits.

Alternatively or additionally, adjacent channels of the multitude of the second channels of the second individual plate can each be separated by a web. These webs of the second individual plate and the first channels of the first individual plate can be designed and arranged in a manner such that projections of the first channels onto the second individual plate perpendicularly to the planar surface plane of the second individual plate cross the webs of the second individual plate along one or more crossing regions of the webs. The webs of the second individual plate can be sunk in the crossing regions or at least in some of the crossing regions, so that the second channels which run on both sides of the respective web are in fluid connection via the depression of this web. A rear side which of the base of the depression of the respective web of the second individual plate, said rear side facing the first individual plate, in this case too can be materially connected to a rear side of the base of the first channel, said rear side facing the second individual plate and said first channel crossing the web of the second individual plate. This arrangement again displays the already described advantages with regard to stability, service life and improved flow behaviour of the media which is led in the channels of the individual plates. For example, a multitude of depressions with material-fit connections of the described type can be formed in the same web of the first and/or the second individual plate. In the case of a fuel cell, the media which are led or can be led in the first and/or second channels can be reaction gases, fuels as well as reaction products. Usually, coolant is led on the rear side of the webs, i.e. between the individual plates. In the case of a humidifier cell, the media which are led or can be led in the first and/or second channels in particular can be humid gas, gas to be humidified as well as in the further course depleted humid gas and at least partly humidified gas.

The webs and channels of the individual plates can be designed and arranged in a manner such that the same first or second channel crosses two or more adjacent webs and channels of the respective other individual plate. Again, depressions with material-fit connections of the described type can be formed in crossing regions of the two or more adjacent webs of the respective other individual plate, said crossing regions being defined by this channel.

The first channels can be designed in a manner such that they run in a straight line, in particular parallel to one another at least in sections. Alternatively or additionally, the first channels at least in sections can run in a fan-like manner. Alternatively or additionally, the first channels at least in sections can run arcuately, in particular in the shape of a circular arc section or in a wave-like manner. That which has been said here with regard to the course of the first channels can just as well be valid for the course of the second channels, wherein identical, similar or different channel courses can be present on both individual plates. In this manner, the course of the first and/or the second channels can be adapted to the geometry of the different functional regions of the respective individual plate in a diverse manner.

The webs and channels of the first individual plate can cross the webs and channels of the second individual plate parallel to the planar surface planes of the individual plates e.g. at a crossing angle $\alpha$. The crossing angle $\alpha$ can be: $15°\leq\alpha\leq165°$, preferably $30°\leq\alpha\leq150°$.

Typically, the individual plates are designed as metal plates, e.g. as plates of steel or stainless steel. The individual plates can herein be coated at least sectionally at least on one of their surfaces, in particular with a coating for corrosion prevention and/or for improving the electrical conductivity. The material-fit connection or the material-fit connections between the rear sides of the web depressions and the rear sides of the channel bases of the individual plates can be welding connections, in particular laser welding connections. Laser welding methods are particularly well suited for the automated formation of the material-fit connections between the individual plates. The material-fit connections or at least some of the material-fit connections can alternatively be designed as solder connections or bonding connections.

The individual plates can each have thickness defined perpendicularly to the planar surface plane of the respective individual plate of between 50 μm and 150 μm, preferably 70 μm and 110 μm, including or excluding the specified limit values. The channels and the webs can e.g. be embossed into the individual plates. Sheets of the mentioned thickness have a low weight and a good shaping ability whilst retaining an adequate stability.

The material-fit connection at the rear side of the base of the depression of the web of an individual plate can extend at an angle of $-25°$ to $+25°$, in particular of $-10°$ to $+10°$ relative to the main direction of extension of the channel of the other individual plate, said connection connecting the rear side of this channel to the rear side of the web depression. The wider the contact surface between the rear side of the web depression and the rear side of the channel base in the respective crossing region or along the respective crossing region, the greater can the deviation of the alignment of the material-fit connection from the running direction of the respective channel be.

The material-fit connection can extend at the rear side of the base of the web depression of one of the individual plates continuously or in sections over a length which corresponds to at least double, preferably fivefold, in particular at least tenfold the width of the material-fit connection. The material-fit connection at least in sections can extend over a length which corresponds at least to the width of the web in the respective crossing region, preferably to at least double the web width in the crossing region. The length of the material-fit connection can also correspond at least to the width or at least to the average width of one of the channels which runs on both sides of the respective web. The connection seam which is formed by the material-fit connection can be continuous. The connection seam can alternatively also comprise dashed or dotted sections. The greater the angle which the web spans with the channel crossed by it differs from 90°, the longer can the connection be.

The base of the respective web depression of the first and/or the second individual plate can be continuously sunk as far as the bases of the channels, said channels being adjacent to this web. The rear sides of the base of the web depression and of the channel bases which connect to the web depression, said rear sides facing the respective other plate can e.g. be designed in a manner such that they lie in one plane. E.g. the material-fit connection then, following the course of the channel which is connected or is to be connected to the web depression, can extend transversely (however not necessarily perpendicularly) to the course of the web and to the course of the channels which are adjacent to the web, over the complete width of the web and additionally over the complete width of the adjacent channels or over the complete width of at least one of the adjacent channels. This can advantageously contribute to the stability and the life duration of the material-fit connection.

A first end of the first and/or of the second channels can be in fluid connection with at least a part of an active region of the respective individual plate. Alternatively or additionally, a second end of the first and/or the second channels can each be in fluid connection with a through-opening of the separator plate. The through-opening can be configured e.g. for feeding a medium to the active region or for leading a medium out of the active region. On stacking the separator plates, the aligned through-openings of the separator plates of the stack typically form channels in the stack, said channels going through the stack along the stack direction. Media can be fed to the stack via these channels. Media can likewise be led away out of the stack via these channels.

The individual plates can comprise beads which encompass the through-openings and are for sealing the respective through-opening. The first end of the first channels and/or of the second channels can then be in fluid connection e.g. with a bead feed-through for leading a medium through the respective bead.

The first channels and/or the second channels can form at least a part of a distributing region of the respective individual plate, said distributing region also being called feed region or discharge region. This distributing region can comprise a first edge region, in which the first or the second channels are in fluid connection with at least a part of an active region of the respective individual plate, and can each comprise a second edge region, in which the first or second channels are each in fluid connection with a through-opening of the separator plate. Here, the through-opening serves for feeding a medium to the active region or for leading a medium out of the active region, via the distributing region. This distributing region can extend in particular between two channel branchings of at least one, preferably of several channels. A multiplication of the number of channels or a reduction of the number of channels can be realised with these channel branchings. The channel branching can comprise a transition of the mentioned bead feed-through to the feed region or away from the discharge region. The channel branchings advantageously extend in the two previously mentioned edge regions of the distributing region. In particular, both channel branchings of a channel, in a distributing region or adjacent to it, in the flow direction can either both have an increase or both have a reduction of the number of channels.

Such distributing regions often span an approximately triangular surface. The channels of the distributing region hereby run essentially transversely to the running direction of the channels in the active region. The total length of the channels which run parallel to one another is therefore mostly very different and often a few short marginal channels or webs arise. If one considers those 80% of the channels or webs which have the largest total length within a distributing region, then their web sections between the depressions have a length of at least 10 mm, preferably at least 12 mm. Here however, it is only the webs sections between the depressions which are considered and terminal webs sections are often shorter.

Basically, it is possible for the distributing regions, apart from the channel regions and web regions which extend parallel to the planar surface plane of the respective individual plate, as well as apart from the regions which connect the channel regions and web regions and which run transversely to the planar surface plane of the respective individual plate, to comprise yet further regions which extend parallel to the planar surface plane on a different plane than the channel regions and the web regions. This can be advantageous for example for optimising a pressure drop or volume flow. However, it is preferable for the distributing regions—disregarding edge regions—to consist of the above mentioned channel regions and web regions as well as of the regions which connect the channel and web regions, run transversely to the planar surface plane of the respective indicial plate and of which the channel regions and web regions each extend in precisely one plane. The at least one distributing region of an individual plate in this advantageous case thus comprises regions which extend parallel to the planar surface plane of the respective individual plate, and specifically such that the regions are distributed onto exactly two planes.

Embodiment examples of the invention are represented in the drawings and are explained in more detail by way of the subsequent description. The same and similar reference numerals are used in these examples for the same and similar elements, so that their explanation is not necessarily repeated. The subsequent examples moreover comprise a multitude of additional features which can further improve the invention. However, not only can these additional features be applied exclusively in the combination which is shown in the respective example, but also in isolation from one another or in combination with other features in other examples. The represented examples all relate to a bipolar plate for a fuel cell system. Concerning alterative, non-represented embodiments, the electrochemical system can likewise be designed as an electrolyser, compressor or as a humidifier for an electrochemical system and comprise separator plates. The channel depression which is essential to the invention and the connection of the individual plates which is arranged there are hereinafter represented only for the distributing region of a separator plate. However, if the first and second channels run in a manner crossing one another in the active region, they can also be provided just as well there in the case of embodiments which are not represented. There are shown in:

DETAILED DESCRIPTION OF THE INVENTION

Figure 1:
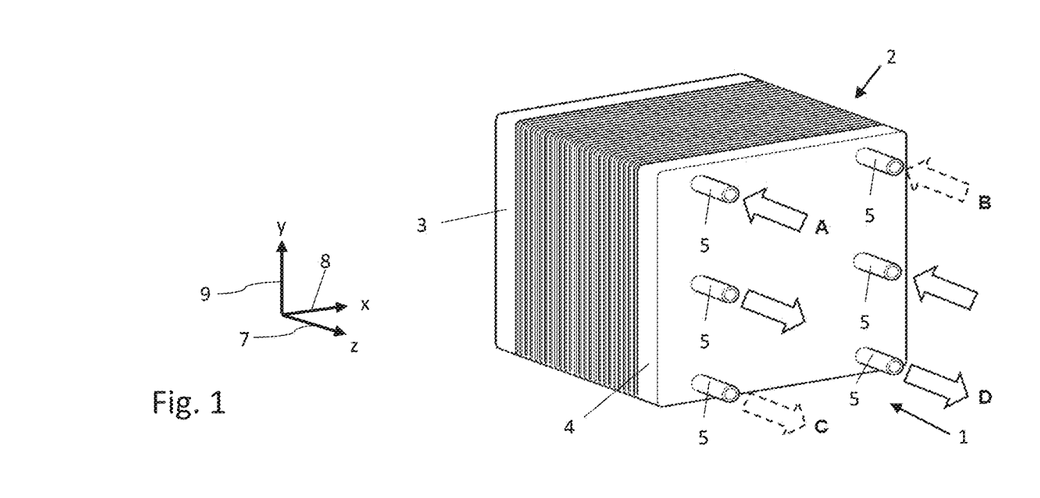
FIG. 1 a fuel cell stack with a multitude of stacked bipolar plates.

FIG. 1 shows an electrochemical system 1 with a stack 2 of constructionally equal separator plates which are stacked along a z-direction 7 and are clamped between two end plates 3, 4. The separator plates here are designed as bipolar plates and each comprise two individual plates which are connected to one another. In the present example, the system 1 is a fuel cell stack. Two adjacent bipolar plates of the stack 2 between them therefore enclose an electrochemical cell which serves for converting chemical energy into electrical energy. The electrochemical cells each comprise e.g. a membrane electrode assembly (MEA) and gas diffusion layers (GDL). In the case of alternative embodiments, the system 1 can just as well be designed as an electrolyser, compressor or as a humidifier for an electrochemical system such as a fuel cell system. Separator plates are likewise used with these electrochemical systems. The construction of these separator plates corresponds to the construction of the bipolar plates which are described here in more detail, even if the media which are led onto or through the separator plates are different.

The z-axis together with an x-axis 8 and a y-axis 9 spans a right-handed Cartesian coordinate system. The end plate 4 comprises a multitude of ports 5, via which the media can be fed to the system 1 and via which media can be led out of the system 1. These media which can be fed to the system 1 and led out of the system 1 can comprise e.g. fuels such as molecular hydrogen or methanol, reaction gases such as air or oxygen, reaction products such as water vapour or coolant such as water and/or glycol.

Figure 2:
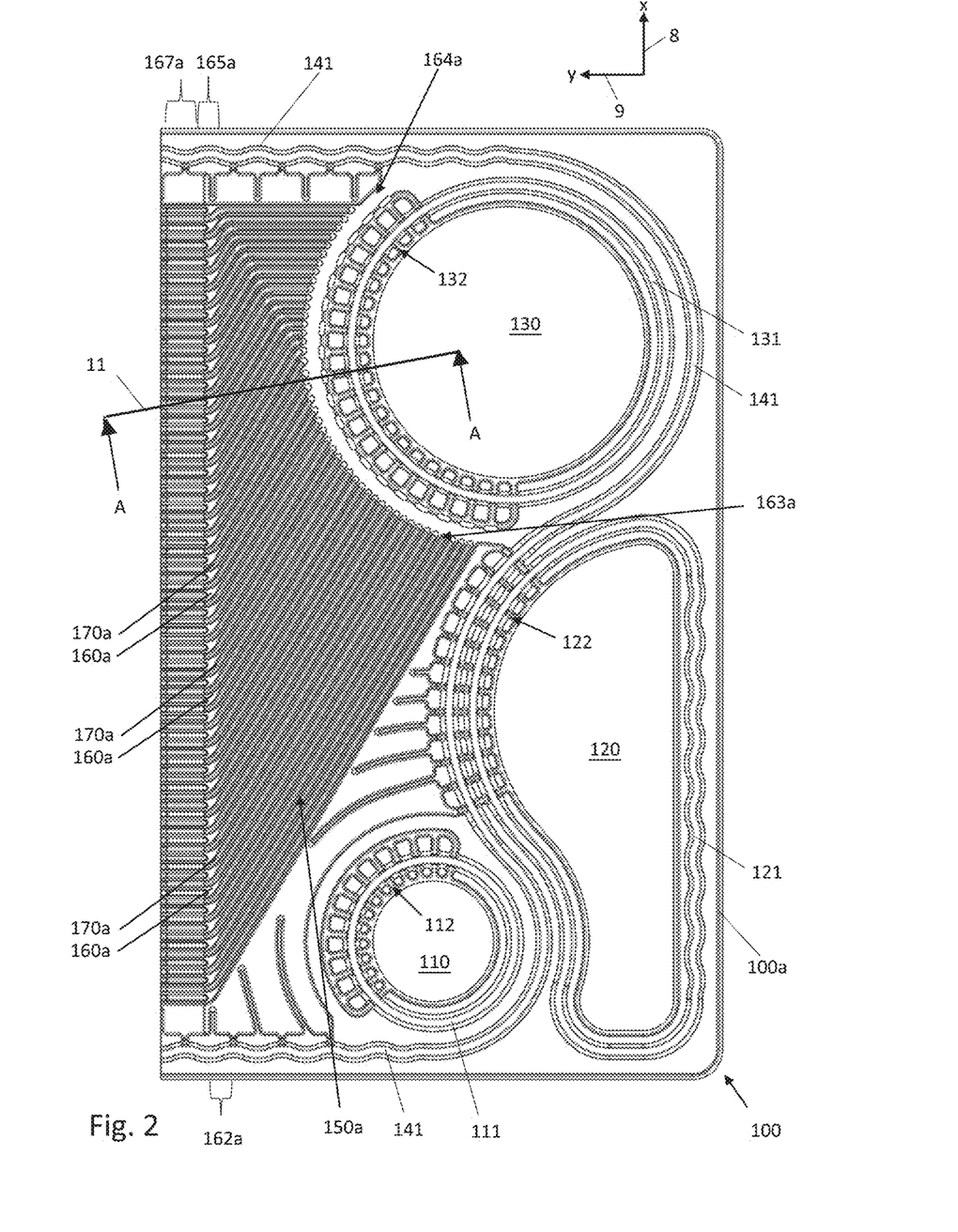
FIG. 2 a detail of a bipolar plate of the stack of FIG. 1 in a slightly exploded representation, wherein the bipolar plate comprises channel structures and through-openings.
Figure 3:
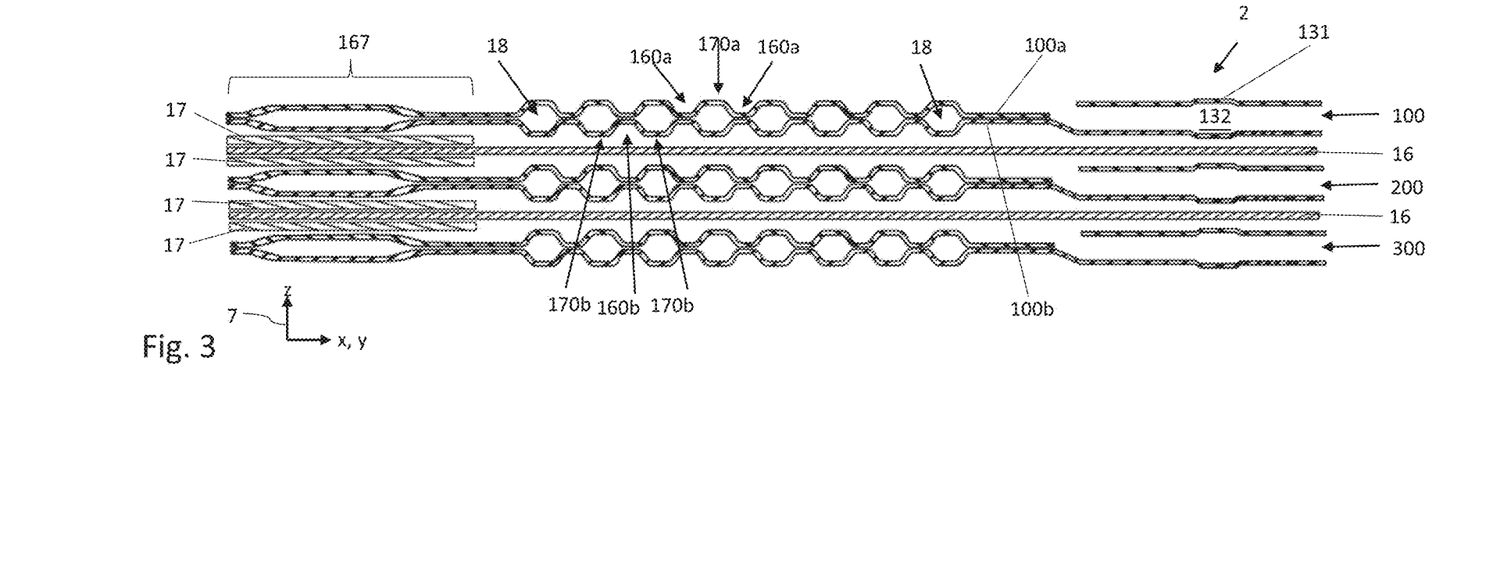
FIG. 3 a section through the stack of FIG. 1, wherein the section plane is aligned perpendicularly to the planar surface plane of the plates of the stack.

FIG. 2 shows a part of a bipolar plate 100 of the stack 2 from FIG. 1 in a plan view, in particular a part of a first metallic individual plate 100a of the bipolar plate 100. FIG. 3 shows a section through a part of the stack 2 of FIG. 1, wherein the section plane is aligned parallel to the z-axis 7 and runs along the section line 11 which is represented in FIG. 2.

It can be derived from FIG. 3 that the bipolar plate 100 apart from the first individual plate 100a comprises a second individual plate 100b, wherein the individual plates 100a, 110b are materially connected to one another in regions at their rear sides of the bases which face one another 10, for forming the bipolar plate 100. In the embodiment example described here, the individual plates 100a, 100b are designed as metal sheets, in particular as stainless steel sheets. In the case of modified embodiments, the individual plates 100a, 100b can be manufactured at least partly of non-metallic materials, e.g. from heat-resistant, preferably electrically conductive plastic. The individual plates 100a, 100b perpendicularly to their planar surface plane each have a thickness 190a, 190b (see FIG. 5) of 100 μm. Here, the individual plates 100a, 100b are regionally connected to one another along their rears sides which face one another by way of laser welding connections. With regard to modified embodiments, the individual plates 100a, 100b can also be regionally connected by other material-fit connections, e.g. by other welding connections, by solder connections or by bonding connections. FIG. 3 moreover shows further bipolar plates 200, 300 which are constructionally identical to the bipolar plate 100, as well as an MEA and gas diffusion layers 17, said MEA and gas diffusion layers being arranged between the bipolar plates 100, 200, 300.

The bipolar plate 100 which is shown in FIG. 2 comprises through-openings 110, 120, 130. The through-openings 110, 120, 130 together with remaining bipolar plates of the stack 2 of FIG. 1 form conduits for the supply and discharge of media. These conduits pass through the stack 2 in the z-direction 7 and are each in fluid connection with one of the ports 5 which is shown in FIG. 1.

Around the through-openings 110, 120, 130, the bipolar plate 100 comprises beads 111, 121, 131 which are shaped in the bipolar plate 110. The beads 111, 121, 131 serve for sealing the conduits which are formed by the through-openings 110, 120, 130, with respect to the respective other media spaces and with respect to the surroundings. A further bead 141 encompasses the through-openings 110, 130, the beads 111, 131 as well as an active region of the individual plate 100a which connects at the left end of the picture of FIG. 2 and in FIG. 2 is only represented in a very short section 167a. The bead 141 serves for sealing the active region and the through-openings 110, 130 of the individual plate 100a with respect the through-opening 120 and the surroundings. In the present example, this active region 167a delimits an electrochemical cell which is arranged between the individual plate 100a and a bipolar plate of the stack 2 which is adjacent to the bipolar plate 100.

FIG. 2 moreover shows that the beads 111, 121, 131 each comprise feed-throughs 112, 122, 132 transversely through the beads 111, 121, 131. These feed-throughs 112, 122, 132, also called bead feed-throughs, each serve for the targeted and metered leading-through of media through the beads 111, 121, 131. For example, the feed-throughs 112, 122, 132 in the beads 111, 121, 131 each serve for creating a fluid connection between the conduits which are formed by the through-openings 110, 120, 130 and the media distributing channels 160 and finally the active region 167a of the bipolar plate 100 or between the conduits and a cavity 18 (FIG. 3) which is spanned between the individual plates 100a, 100b and which is designed for receiving and circulating a coolant.

One can moreover derive from FIG. 2 that the individual plate 100a at its front side which is away from the second individual plate 100b comprises a distributing region 150a with a multitude of channels 160a for leading media. The channels 160a are shaped, in particular embossed in the individual plate 100a. The channels 160a run for the most part in a straight manner and parallel to one another. The channels 160a run arcuately in sections, specifically in the transition 165a from the distributing region 150a to the active region 167a. Those channels 160a which run above the middle of the through-opening 130 moreover comprise a sharp bend location. The channels 160a are each embossed into the individual plate 100a as recesses, wherein a web 170a which fluidically separates the channels 160a or fluidically separates these at least in sections is formed between two adjacent channels 160a. The distributing region 150a thus comprises a multitude of webs 170a. The channels 160a at half their respective height have a smaller width 161a than the webs 170a which are formed between the channels 160a and whose width is indicated at 171a. The widths 161a of the channels 160a are e.g. each about 0.2 mm (see FIGS. 5 and 6). The channels 160a and the webs 170a each extend over a length of between roughly 1.5 cm and 11 cm.

The distributing region 150a of the first individual plate 100a with the channels 160a creates a fluid connection between the conduit of the stack 2 which is formed by the through-opening 130 and an active region 167a of the first individual plate 100a at the front side of the first individual plate 100a which is away from the second individual plate 100b. A medium which is led in the conduit which is formed by the through-opening 130 can thus be led via the bead feed-through 132 and via the channels 160a into the active region 167a of the first individual plate 100a or vice versa. The channels 160a continue in channels of the active region 167a but one end, specifically the second end of the channels 160a is defined in the transition region 165a. In particular, second ends 162a of the channels 160a are in fluid connection with the active region 167a of the first individual plate 100a and there merge into other channels. First ends 163a of the channels 160a are in fluid connection with the through-opening 130 of the bipolar plate 100 or with the feed or discharge conduit of the stack 2 which is formed by the through-opening 130, and specifically in particular via the bead feed-through 132. The channels 160a fan out towards the active region 167a of the individual plate 100a, thus in the transition region 165a of the channels 160a, wherein the channels 160a in the represented embodiment example, disregarding the few channels 160a with sharp-bend locations, run essentially parallel. A cross section of the channels 160a therefore increases in the transition region 165a to the active region 167a of the individual plate 100a, since further webs are possibly formed there in the active region 167a.

The number of channels 160a is larger than the number of feed-throughs 132 through the bead 131, e.g. at least by a factor of 1.5 or at least by a factor of 2. A transition region 164a between the bead 131 and the ends 163a of the channels 160a which face the through-opening 130 is therefore a branching region of the first individual plate 100a. The number of channels which fluidically connect the through-opening 130 to the active region of the first individual plate 100a is increased in this branching region.

In the active region 167a of the first individual plate 100a, the number of channels or channel-like structures for leading the media is once again larger than the number of channels 160a, i.e. again at least by a factor of 1.5 or at least by a factor of 2. A transition region 165a between the ends 162a of the channels 160a which face the active region 167a of the first individual plate 100a and the active region 167a of the first individual plate 100a therefore represents a branching region of the first individual plate 100a. The number of channels which fluidically connect the through-opening 130 to the active region of the first individual plate 100*a* increases in this branching region. In this context, the channels 160*a* are arranged between two branching regions of the first individual plate 100*a*.

Figure 4A:
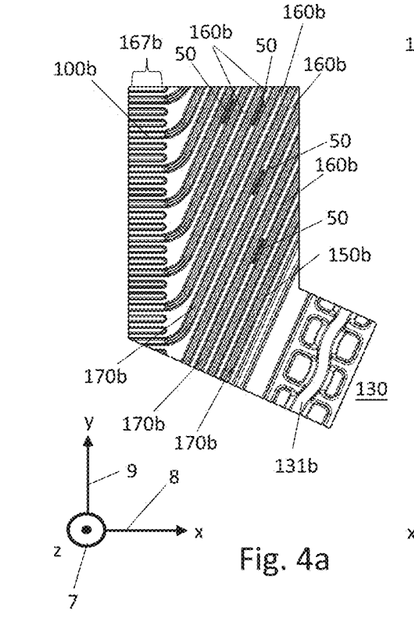
FIG. 4 details of plan views upon the surfaces of a bipolar plate according to the invention, of a section through the active region of the bipolar plate as well as a view through this bipolar plate.
Figures 4B, 4C:
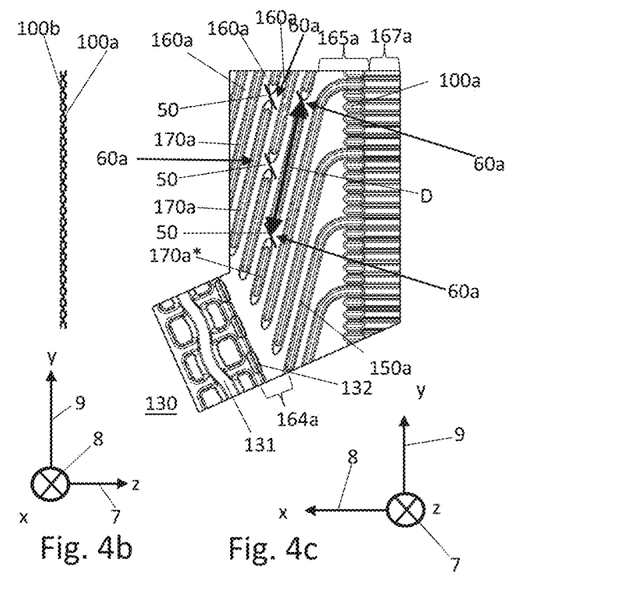

FIG. 4*c* shows a detail of the distributing region 150*a* at the front side of the first individual plate 100*a* which is away from the second individual plate 100*b*, with the first channels 160 and with the webs 170*a* which are arranged between the first channels 160*a*. FIG. 4*c* again in sections shows the through-opening 130 and the bead 131 which encompasses the through-opening 130, as well as a short section 167*a* of the active region of the first individual plate 100*a*. One can clearly recognise the branching regions 164*a* and 165*a*, in which the number of channels which fluidically connect the through-opening 130 to the active region 167*a* of the first individual plate 100*a* increases from the through-opening 130 to the active region 167*a*.

FIG. 4*a* shows a detail of a distributing region 150*b* at the front side of the second individual plate 100*b* which is away from the first individual plate 100*a*. FIG. 4*a* moreover in sections shows the through-opening 130 and the bead 131 which encompasses the through-opening 130 in this position, as well as a short section 167*b* of the active region of the second individual plate 100*b*. Just as the distributing region 150*a* of the first individual plate 100*a*, the distributing region 150*b* of the second individual plate 100 comprises a multitude of channels 160*b* and a multitude of webs 170*b* which are arranged between two adjacent channels 160*b*, wherein the webs 170*b* fluidically separate the channels 160*b* at least in sections. Just as the channels 160*a* of the first individual plate 100*a*, the channels 160*b* of the second individual plate 100*b* create a fluid connection between a through-opening 130 of the bipolar plate 100 and the active region 167*b* of the second individual plate 100*b* at the front side of the second individual plate 100*b* which is away from the first individual plate 100*a*.

FIG. 4*b* represents a section through the inventive bipolar plate 100 of FIGS. 4*a* and 4*c* through the active region, specifically the left outer edge of FIG. 4*a* and the right outer edge of FIG. 4*c* respectively, and the two individual plates 100*a*, 100*b* can be recognised herein in the joined condition.

Figure 4D:
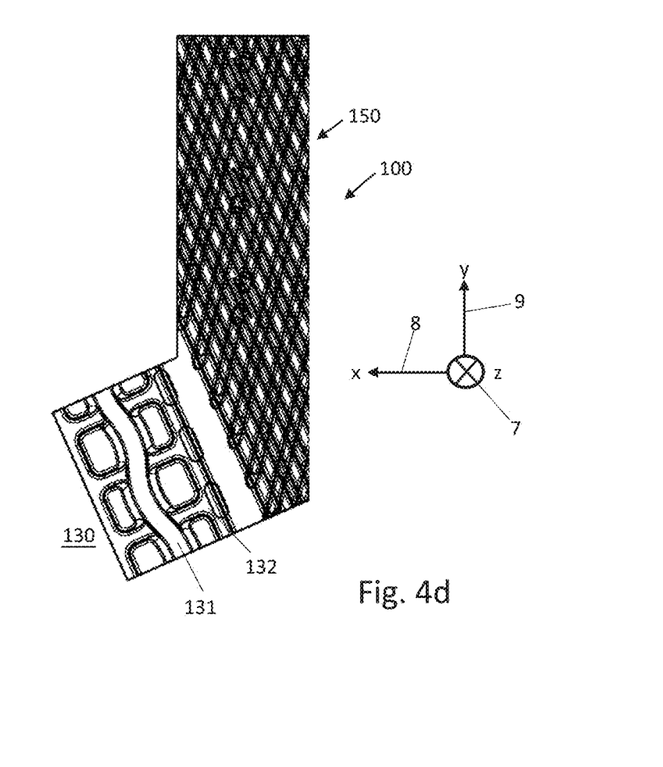

FIG. 4*d* shows the complete bipolar plate 100 which is also already represented in FIGS. 4*a-c*, but now in a view through the two individual plates 100*a*, 100*b*, wherein the individual plate 100*a* which is shown in FIG. 4*c* lies at the top. The details of the distributing regions 150*a*, 150*b* such as the welding connections between the individual plates 100*a*, 100*b* can hardly be recognised due to the now crossing channels 160*a* and 160*b* and the webs 170*a* and 170*b* which cross one another. These individual plates are represented in the FIGS. 4*a* and 4*c* for this reason.

The distributing regions 150*b* and 150*a* of the second individual plate 100*b* and of the first individual plate 100*a* which are shown in the FIGS. 4*a* and 4*c* are materially connected to one another in regions along their rears sides which face one another, here in particular by laser welding connections along the material-fit connections 50.

Due to the fact that the channels 160*b* and the webs 170*b* of the second individual plate 100*b* as well as the channels 160*a* and the webs 170*a* of the first individual plate 100*a* each run obliquely from the bottom left to the top right in the representations of the respective front sides of the individual plates 100*a* and 100*b* in FIGS. 4*a*, 4*c*, it results that the channels 160*a* and the webs 170*a* of the distributing region 150*a* of the first individual plate 100*a* and the channels 160*b* and the webs 170*b* of the distributing region 150*b* of the second individual plate 100*b* run crossed to one another in parallel planes. In the example of FIGS. 4*a*, 4*c*, the channels 160*a* and the webs 170*a* of the first individual plate 100*a* enclose a crossing angle e.g. of approx 50° and 130° with the channels 160*b* and the webs 170*b* of the second individual plate 100*b* respectively.

Regions 60*a* of the webs 170*a* of the first individual plate 100*a*, in which a perpendicular projection of one of the channels 160*b* of the second individual plate 100*b* onto the first individual plate 100*a* crosses one of the webs 170*a* of the first individual plate 100*a* are called crossing regions of the webs 170*a* of the first individual plate 100*a*. In a completely corresponding manner, regions 60*b* of the webs 170*b* of the second individual plate 100*b*, in which a perpendicular projection of one of the channels 160*a* of the first individual plate 100*a* onto the second individual plate 100*b* crosses one of the webs 170*b* of the second individual plate 100*b* are called crossing regions of the webs 170*b* of the second individual plate 100*b*.

As described initially, a decisive disadvantage of known separator plates lies in the fact that the individual plates of the separator plate in such regions, in which the channels of the individual plates run in a crossed manner as described here, are typically only connectable along very small contact regions, specifically where the rear sides of the channel bases of the two individual plates, said rear sides facing one another, cross one another.

The improvement which is suggested here lies in at least the webs 170*a* of the first individual plate 100*a*, as is shown in FIG. 4*c*, being sunk in at least some of the crossing regions 60*a* in a manner such that the rear side of the first individual plate 100*a* which faces the second individual plate 100*b* is in contact and materially connected in these crossing regions 60*a* to the rear side of the base of the respective channel 160*b* of the second individual plate 100*b*, here e.g. by way of laser welding connections. The contact surfaces, along which the rear sides of the individual plates 100*a*, 100*b* are in contact and are connected or connectable to one another in the distributing regions 150*a*, 150*b* can be significantly enlarged in such a way. The webs 170*a* in the crossing regions 60*a* are each sunk along the running direction of the webs 170*a* over a length which corresponds to roughly double the width of the channel which is crossed by the web 170*a*, at half the height of this channel, here e.g. each over a length of approx. 0.4 mm. Moreover, a fluid connection of the channels 160*a* which run on both sides of the respective web is created via the web depressions in the crossing regions 60*a*. The positions for the web depressions can therefore e.g. also be selected in a targeted manner, in order to create a desired flow profile of the medium in the distributing region 150*a* by way of the additional flow connections between adjacent channels 150*a*. For example, the web depressions can be placed in a targeted manner in order to compensate or reduce any pressure differences or differences in mass transport in the channels 160*a*.

As is to be deduced from FIG. 4*a*, the course of the material-fit connections 50 between the individual plates 100*a*, 100*b* is typically essentially defined by the course of the base of the respective channel 160*b* of the second individual plate 100*b*, at the rear side of said base the material-fit connection 50 is formed. FIG. 4*a* hence shows that the material-fit connections 50 are each aligned parallel or essentially parallel to the course of the channels 160*b* and the webs 170*b* in the distributing region 150*b* of the second individual plate 100*b*. The alignment of the material-fit connections 50 can possibly differ slight from the running direction of the base of the respective channels 160*b*, e.g. by an angle of up to 25°, preferably by an angle of up to 10°, depending on the width of the base of the channels 160*b*.

A length of the material-fit connections 50 in the example of FIGS. 4*a*, 4*c* corresponds to at least double the width of the webs 170*a* on account of the angle between the channels 160*a* and 160*b* which differs greatly from 90°. The length of the material-fit connections 50 there likewise corresponds to at least double the width of the channels 160*b* which are crossed by the sectionally sunk webs 170*a*, at half the height of these channels. E.g. the material-fit connections in FIGS. 4*a*, 4*c* each extend over a length of at least 0.7 mm. In particular, the length of the material-fit connections 50 in the FIGS. 4*a*, 4*c* each correspond to tenfold the width of the respective material-fit connection 50 in the region of the boundary surface between the two individual plates 100*a*, 100*b*.

As has already been made clear from FIG. 2, distributing regions 150*a* of separator plates can span an approximately triangular surface. It can be seen from FIG. 2 as well as FIG. 4*c* that the channels 160*a* of the distributing region 150*a*, within such an approximately triangular surface run essentially transversely to the running direction of the channels in the active region 167*a*, in order be able to feed or discharge medium to and away from the complete width of the active region 167*a*. The total length of the channels 160*a* which run parallel to one another is very different and often a few short marginal channels or webs, for instance the web 170*a**  result. Here, webs sections which lie between such marginal channels or webs have an identical length D which extends between two web depressions which lie closest to one another. The length D is 14 mm in the present example.

Figure 5A:
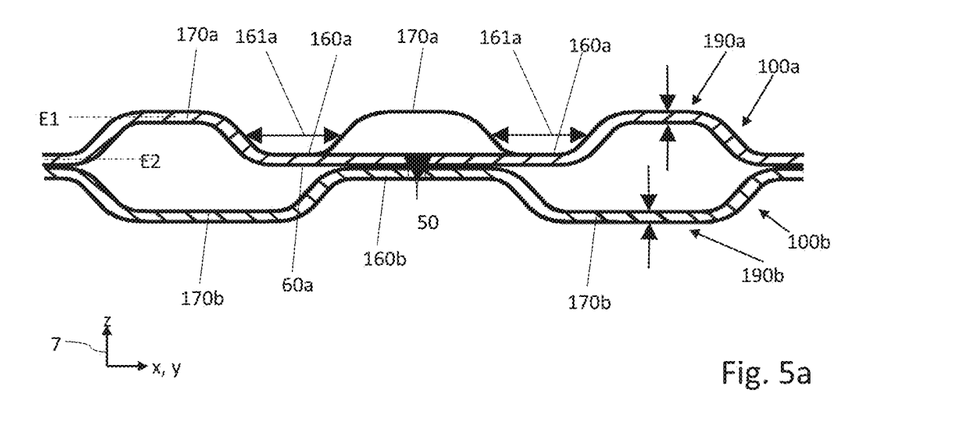
FIG. 5 detail views of a section through two different bipolar plates according to the invention, in the region of a sunk web.
Figure 5B:
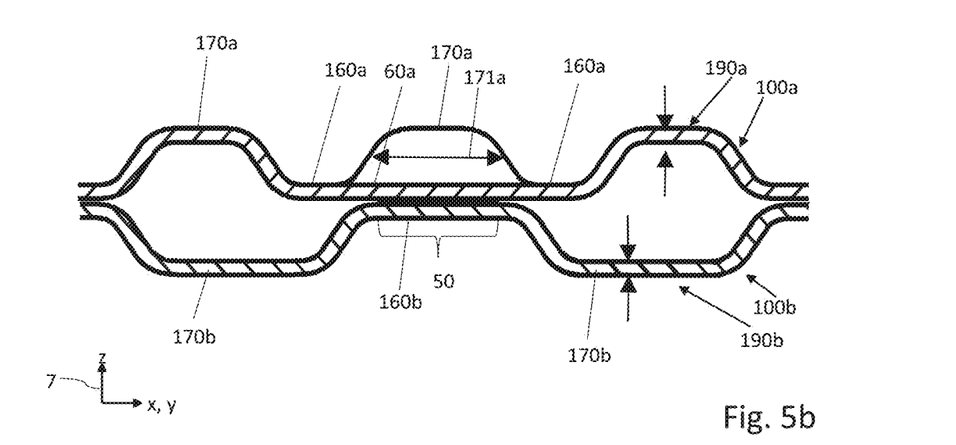

FIG. 5*a* shows one of the material-fit connections 50 which is shown in the FIGS. 4*a* and 4*c*, specifically a welding connection between the individual plates 100*a*, 100*b*, in cross section, whereas FIG. 5*b* represents an alternative, material-fit connection, specifically a bonding or solder connection between two individual plates 100*a*, 100*b*. The section plane in FIGS. 5*a* and 5*b* is aligned perpendicularly to the planar surface planes of the individual plates 100*a*, 100*b* and perpendicularly to the running direction of the webs 170*a* and the channels 160*a* of the first individual plate 100*a*. The section plane in FIGS. 5*a* and 5*b* is therefore selected such that the webs 170*a* and the channels 160*a* of the first individual plate 100*a* have a minimal width along the section plane. Since the webs 170*b* and the channels 160*b* of the second individual plate 100*b* run obliquely relative to the channels 160*a* and the webs 170*a* of the first individual plate 100*a*, the widths of the channels 160*b* and of the webs 170*b* of the second individual plate 100*b* in FIG. 5 is enlarged compared to the widths of the channels 160*a* and the webs 170*a* of the first individual plate 100*a*.

It can be clearly recognised in FIGS. 5*a* and 5*b* that the middle web 170*a* is sunk down to the base of the two adjacent channels 160*a*. The rear side of the web depression 60*a* which faces the second individual plate 100*b* therefore lies in a plane with the adjacent rear sides of the bases of the channels 160*a*, said channels running on both sides of the middle web 170*a*, so that a particularly large contact surface along the rear sides of the individual plates 100*a*, 100*b* which face one another arises in the crossing region 60*a* which is represented in FIGS. 5*a* and 5*b* respectively.

Whereas the width of the welding connection first and foremost depends on the applied welding length and in particular on its optics as is evident from FIG. 5*a* and is mostly between 30 µm and 200 µm, concerning bonding or soldering connections as are represented in FIG. 5*b*, one attempts to use at least 75%, preferably at least 95% of the width of the contact surface, in particular the complete width of the contact surface for the connection. Despite this, the advantages of the invention can indeed also be conferred upon welding connections since, on account of the enlarged contact surface between the individual plates 100*a*, 100*b*, lesser demands are placed upon the accuracy of the positioning of an instrument for forming the material-fit connection 50 in the crossing region 60*a* of FIG. 5, than is the case with a connection of individual plates which is known from the state of the art. The advantages of the invention in particular manifest themselves on enlarging the possible lengths of the material-fit connections.

Two planes E1 and E2 which each extend along the neutral fibres of the individual plate 100*a* are indicated in FIG. 5*a*. The plane E1 herein corresponds to the plane, in which a non-sunk web 170*a* extends and the plane E2 corresponds to the plane, in which a channel 160*a* as well as the completely sunk sections of the web 170*a* extends. All regions of the individual plate 100*a*, at least within its distributing region 150*a* and which do not runs transversely to the planar surface plane of the individual plate 100*a* advantageously only run in the plane E1 or the plane E2.

Figure 6:
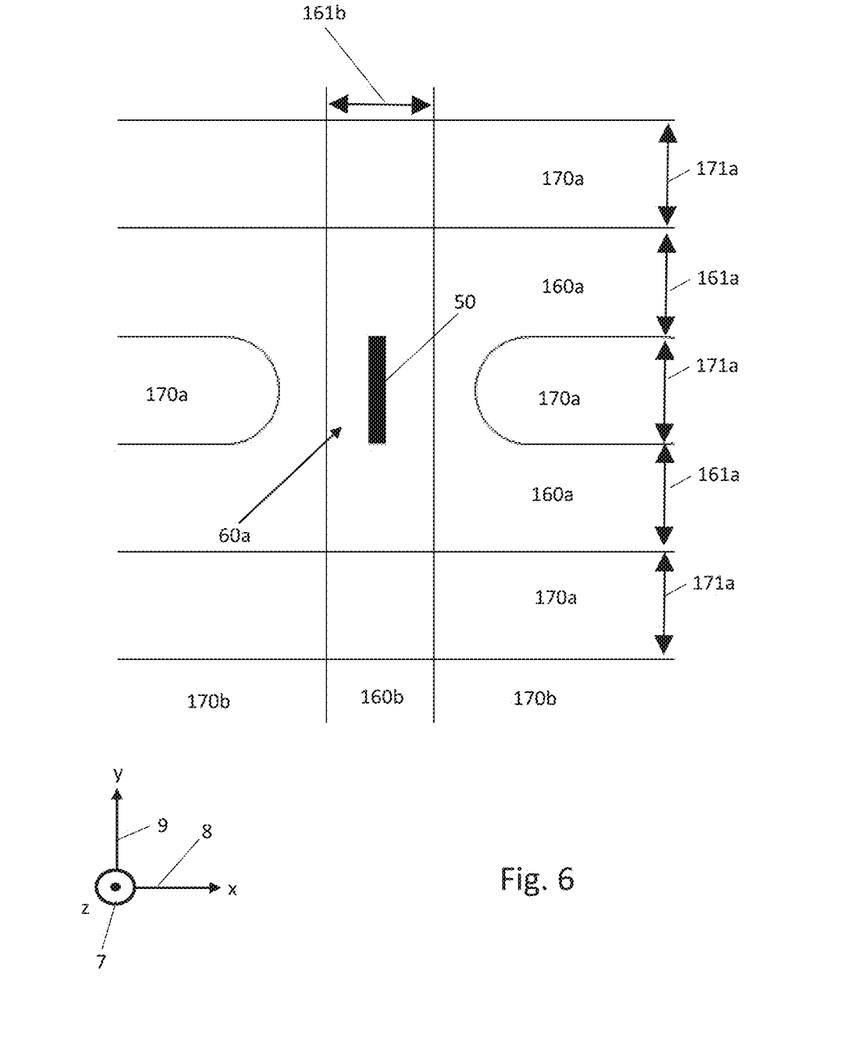
FIG. 6 a plan view upon the crossing region of a sunk web with a channel in a bipolar plate according to the invention; as well as FIG. 7 different embodiment examples of bipolar pates according to the invention, each with at least one crossing region, each in detail in a through-view.

FIG. 6 shows a schematic plan view of a crossing region 60*a* of a web 170*a* of the first individual plate 100*a* in the case of a modified embodiment of the bipolar plate 100. What is shown is the web depression in the middle of the picture, by way of which a fluid connection results between the channels 160*a* of the first individual plate 100*a* which run on both sides of the middle web 170*a*. Moreover, the course of a channel 160*b* of the second individual plate 100*b* is schematically shown, and the base rear side of this channel which faces the first individual plate 100*a* here runs parallel to the x-y plane and thus to the planar surface plane of the first individual plate 100*a* at a right angle to the webs 170*a* and the channels 160*a* of the first individual plate 100*a*. The web depression 60*a* of the first individual plate 100*a*, along its rear side which faces the second individual plate 100*b* is connected by way of a material-fit connection 50 to the rear side of the base of the channel 160*b* of the second individual plate 100*b*, said rear side facing the first individual plate 100*a*. Following the course of the channel 160*b* of the second individual plate, the connection 50 here is aligned perpendicularly to the webs 170*a* and the channels 160*a* of the first individual plate 100*a*. Here, the connection 50 extends in the sunken crossing region 60*a* over the complete width of the sectionally sunk web 170*a*.

Figure 7A:
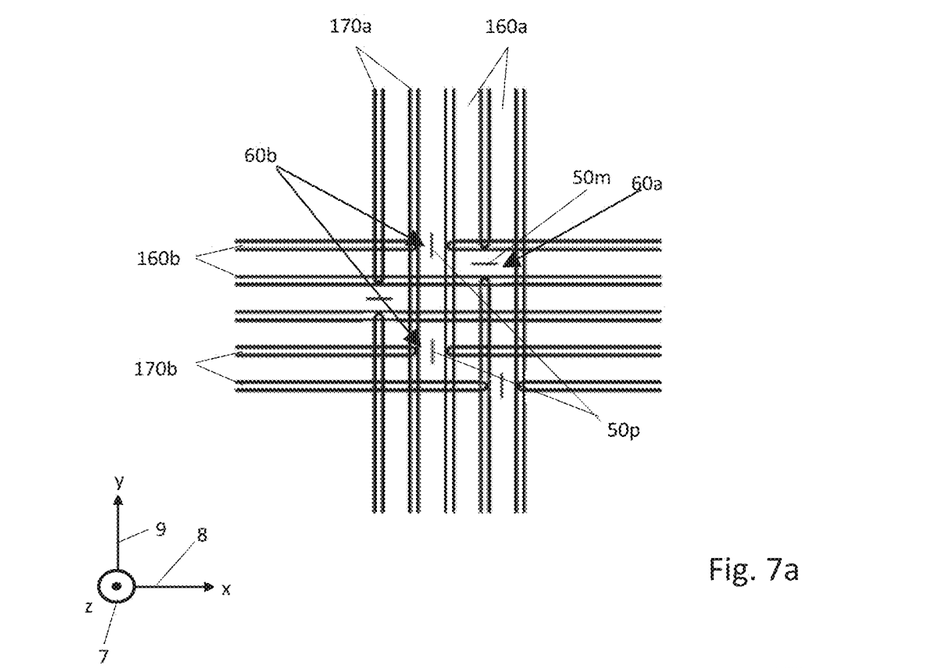

The pictures 7*a*-*f* schematically show further embodiments of webs 170*a* and channels 160*a* of the first individual plate 100*a* and of webs 170*b* and channels 160*b* of the second individual plate 100*b* in a schematic through-view. In some of the embodiments, the webs 170*a* of the first individual plate 100*a* as well as the webs 170*b* of the second individual plate 100*b* have a web depression in some of the regions, in which they are crossed by a channel of the respective other individual plate. Again, material-fit connections of the previously described type are arranged between the individual plates 100*a*, 100*b* in the region of the web depressions. In particular, material-fit connections 50*m*, 50*n* exist between the rear sides of the depressions 60*a* of the webs 170*a* of the first individual plate 100*a* and the rear sides of the bases of the channels 160*b* of the second individual plate 100*b*, as already explained beforehand with regard to FIGS. 4-6. Depressions 60*b* of the webs 170*b* of the second individual plate 100*b* however are also additionally represented in the FIGS. 7*a*-*c*, said depressions along their rear sides being connected to the rear sides of the bases of the channels 160*a* of the first individual plate 100*a* via material-fit connections 50p to 50s. Material-fit connections 50u, 50t which extend over at least one web depression 60a and at least one web depression 60b are further represented. The indices m, n and p to t herein merely serve for the differentiation between the individual designs, and it is always the case of material-fit connections 50. For the purpose of a better overview, only part of the channels, webs, depressions and material-fit connection have been provided with the individual reference numerals in FIGS. 7a-f.

By way of two parallel families of channels 160a, 160b which cross at a right angle, FIG. 7 illustrates that several material-fit connections 50p can be formed along the rear side of the same channel, wherein the two material-fit connections 50p here are distanced to one another by two webs 170b.

Figure 7B:
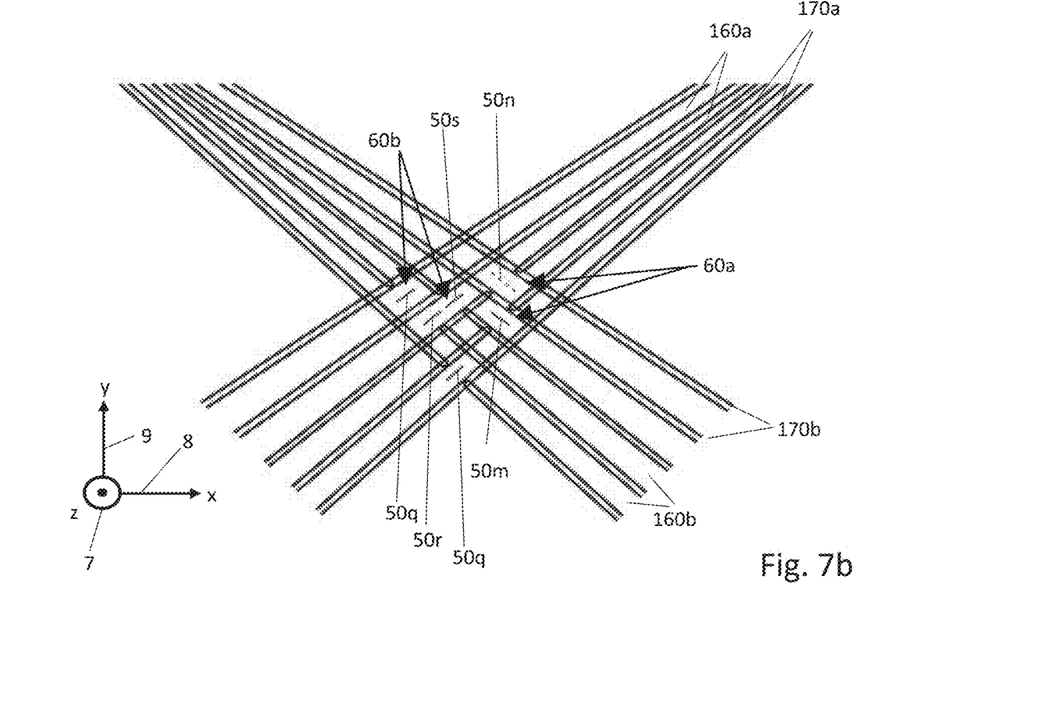

FIG. 7b shows two families of channels 160a, 160b, concerning which the channels 160a, 160b each widen from the top to the bottom. The families cross at an angle of approx. 65° and 115° respectively. Apart from a continuous welding connection 50m, here a welding connection 50n which is composed of several welding points on a line is present in the two depressions or crossing regions 60a. Apart from the welding connections 50q which are designed in the same manner as the welding connections 50p of FIG. 7a, the depressions or crossing regions 60b comprise two further welding connections 50r and 50s which differ from the welding connections 50q in that they lie in a region, in which two webs 170b which are adjacent one another are sunk, so that they directly interact.

Figure 7C:
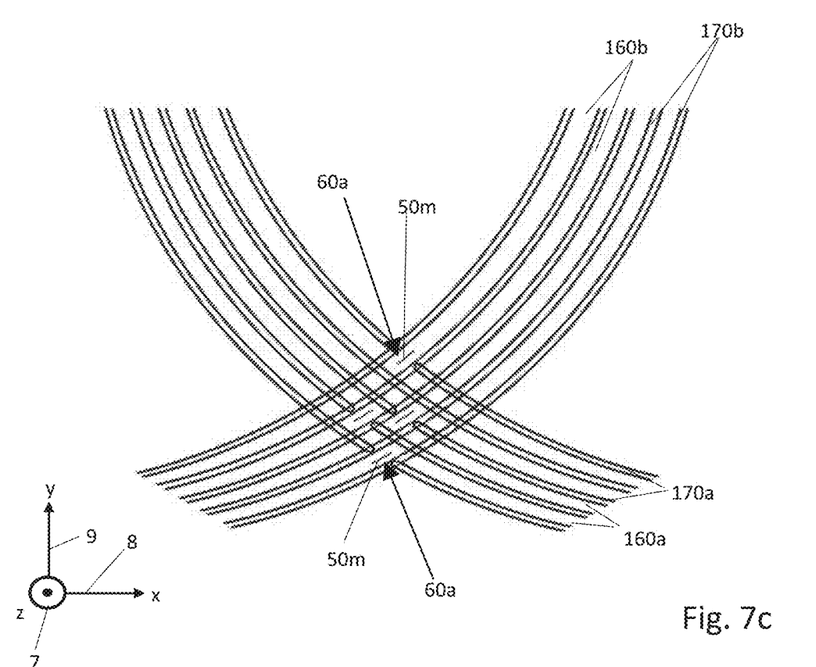
Figure 7D:
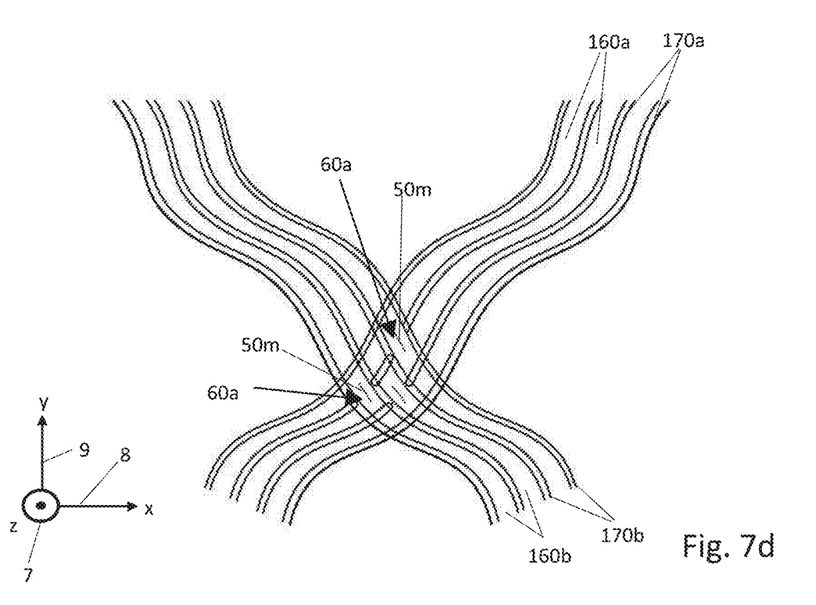

It is shown in FIGS. 7c and 7d that the webs 170a and the channels 160a of the first individual plate 100a and the webs 170b and the channels 160b of the second individual plate 100b can run in an arcuate manner, specifically for example in the manner of a circular arc (FIG. 7c) or in a waved manner (FIG. 7d).

Figure 7E:
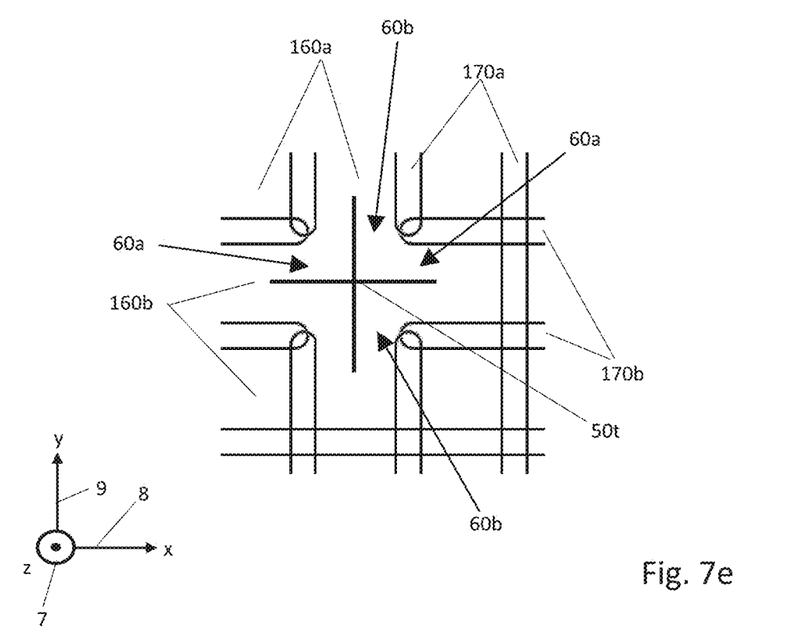
Figure 7F:
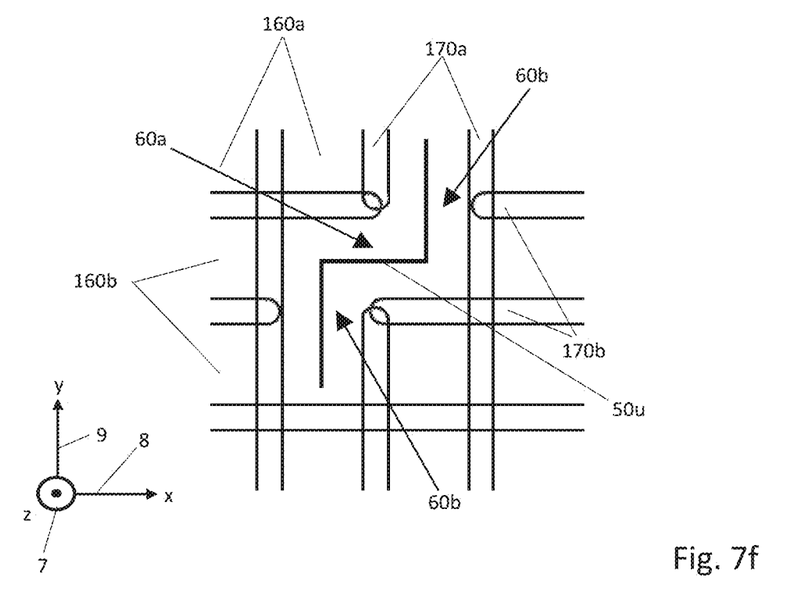

FIGS. 7e and 7f represent more complex depression and connection patterns by way of a right-angled grid of families of channels 160a, 160b which cross one another, wherein these complex patterns are not limited to right-angled arrangements of the channels with a constant width. The complex depression and connection patterns above all can be used to lead media through the channels in a targeted manner.

In FIG. 7e, two webs 170b which are adjacent one another are sunk opposite the same channel 160a amid the formation of the depressions 60b. The two webs 170a which delimit this channel 160a are again sunk in the region between the two adjacent webs 170 which are sunk in sections, amid the formation of the depressions 60a. The contact surface of the rear sides of the bases of the channels 160a, 160b together with the contact surfaces of the rear sides of the depressions 60a and of the rear side of the base of the channel 160b and the together with the contact surfaces of the rear sides of the depressions 60b and the rear side of the base of the channel 160a forms a large contact surface of the two individual plates 100a, 100b which permits a cross-like material-fit connection 50t of the two individual plates 100a, 100b.

FIG. 7f represents an angled connection 50u of the two individual plates 100a, 100b which reaches over three web depressions or crossing regions 60b, 60a and 60b. For this, a web 170b of the second individual plate 100b is sunk in the region opposite a channel 160a of the first individual plate 100a and therefore fluidically connects two channels 160b of the second individual plate 100b. Again a web 170a of the first individual plate 100a is sunk opposite one of these channels 160b of the second individual plate 100b, adjacently to the depression 60b of the web 170b. This depression 60a again fluidically connects two channels 160a of the first individual plate 100a. Again a web 170b of the second individual plate 100b is sunk opposite one of these channels 160a of the first individual plate 100a adjacently to the depression 60a of the web 170a.

The invention claimed is:

1. A separator plate for an electrochemical system, said separator plate comprising a first individual plate and a second individual plate which is connected to the first individual plate;
   wherein the first individual plate comprises first channels for leading media, wherein the first channels comprise two channels running next to one another, being shaped in the first individual plate and being separated from one another at least in sections by a first web which is formed between the first channels;
   wherein the second individual plate comprises a second channel for leading media, said second channel being shaped in the second individual plate;
   wherein a crossing region comprises rear faces of bases of the first channels and a rear face of a base of the second channel in face sharing contact and the second channel arranged at angle between 15 and 165 degrees relative to the first channels;
   wherein the first web and the second channel are arranged such that a projection of the second channel onto the first individual plate crosses the first web in the crossing region; and
   wherein the first web is sunk in the crossing region of the first web, so that the first channels are in fluid connection via the depression of the first web, and a rear side of the base of the depression is in face sharing contact with and bonded to a rear side of the base of the second channel in the crossing region, and a length of the bond between the rear side of the base of the depression and the rear side of the base of the second channel is at least twice a width of the first web.

2. The separator plate according to claim 1, wherein adjacent channels of the first channels are separated at least in sections by a second web, and
   further comprising further second channels of the second individual plate which run next to one another and which are for leading media,
   wherein the first channels, the first and second webs of the first individual plate and the second channels are designed and arranged in a manner such that projections of the second channels onto the first individual plate perpendicularly to the planar surface plane of the first individual plate cross the first and second webs of the first individual plate along one or more crossing regions of the first and second webs, wherein the first and second webs of the first individual plate are sunk in the crossing regions or at least in some of the crossing regions, so that the first channels which run on both sides of a respective web of the first individual plate are in fluid connection via the depression of the respective web, and that a rear side of the base of the respective depression, said rear side facing the second individual plate, is bonded to a rear side of the base of the second channel, said rear side facing the first individual plate and said second channel crossing the first web of the first individual plate.

3. The separator plate according to claim 2, wherein adjacent channels of the multitude of the second channels are likewise separated by webs of the second individual plate, and the webs of the second individual plate and the first channels are designed and arranged in a manner such that projections of the first channels onto the second individual plate perpendicularly to the planar surface plane of the second individual plate cross the webs of the second individual plate along one or more crossing regions of the webs of the second individual plate, wherein the webs of the second individual plate are sunk in the crossing regions or at least in some of the crossing regions, so that the second channels which run on both sides of a respective web of the second individual plate are in fluid connection via the depression of the respective web, and that a rear side of the base of the respective depression, said rear side facing the first individual plate, is bonded to a rear side of the base of the first channel, said rear side facing the second individual plate and said first channel crossing the webs of the second individual plate.

4. The separator plate according to claim 2, wherein a multitude of depressions with bonded connections are formed in a same web.

5. The separator plate according to claim 4, wherein a projection of one or more of the first or the second channels onto the respective other individual plate perpendicularly to the planar surface plane of this individual plate crosses two or more adjacent webs and channels, wherein depressions with bonded connections are formed in the crossing regions of the two or more adjacent webs, said crossing regions being defined by the same channel.

6. The separator plate according to claim 1, wherein the first channels and/or the second channels at least in sections run in a straight lined manner.

7. The separator plate according to claim 1, wherein the first channels and/or the second channels run in a fanned manner at least in sections.

8. The separator plate according to claim 1, wherein the first channels and/or the second channels at least in sections run in an arcuate manner.

9. The separator plate according to claim 4, wherein the individual plates are metal plates and that the bonded connection is a welding connection.

10. The separator plate according to claim 1, wherein a thickness of the individual plates which is defined perpendicularly to the planar surface plane of the individual plates is between 50 μm and 150 μm.

11. The separator plate according to claim 1, wherein the channels and the webs are embossed into the first and second individual plates.

12. The separator plate according to claim 4, wherein the bonded connection at the rear side of the base of the depression of the first web extends at an angle of −25° to +25° relative to the second channel.

13. The separator plate according to claim 12, wherein the bonded connection at the rear side of the base of the depression of an individual plate extends continuously or in sections over a length which corresponds to at least double the width of the bonded connection.

14. The separator plate according to claim 1, wherein the base of the depression of the first web is each continuously sunk as far as the bases of the channels, said channels being adjacent to the first web, so that the rear side of the base of the depression and the rear side of the channels bases, said channel bases connecting to the depression, lie in one plane.

15. The separator plate according to claim 2, wherein a first end of the first and the second channels is in fluid connection with a through-opening of the separator plate and that a second end of the first and the second channels is in fluid connection with at least a part of the active region of the respective individual plate, wherein the through-opening is configured for feeding a medium to the active region or for discharging a medium out of the active region.

16. The separator plate according to claim 15, wherein the individual plates comprise beads which encompass the through-openings and which are for sealing the respective through-opening and that the first end of the first channels and/or of the second channels are in fluid connection with a bead feed-through for leading a medium through the respective bead.

* * * * *